(12) United States Patent
Crosby, II

(10) Patent No.: US 11,366,210 B2
(45) Date of Patent: Jun. 21, 2022

(54) BISTATIC RADAR SYSTEM FOR MOTOR VEHICLE APPLICATIONS

(71) Applicant: Mobile Technology Solutions, LLC, Shelby Township, MI (US)

(72) Inventor: Robert G. Crosby, II, Livermore, CA (US)

(73) Assignee: Mobile Technology Solutions, LLC, Shelby Township, MI (US)

( * ) Notice: Subject to any disclaimer, the term of this patent is extended or adjusted under 35 U.S.C. 154(b) by 195 days.

(21) Appl. No.: 16/507,725

(22) Filed: Jul. 10, 2019

(65) Prior Publication Data

US 2021/0011144 A1    Jan. 14, 2021

(51) Int. Cl.
  *G01S 13/00*    (2006.01)
  *G01S 13/48*    (2006.01)
  *G01S 13/931*   (2020.01)

(52) U.S. Cl.
  CPC ............ *G01S 13/003* (2013.01); *G01S 13/48* (2013.01); *G01S 13/931* (2013.01)

(58) Field of Classification Search
  CPC ....... G01S 13/003; G01S 13/48; G01S 13/931
  See application file for complete search history.

(56) References Cited

U.S. PATENT DOCUMENTS

| 5,608,407 A | 3/1997 | Jain et al. |
| 6,025,796 A | 2/2000 | Crosby, II |
| 6,097,332 A | 8/2000 | Crosby, II |
| 7,845,691 B2 | 12/2010 | Sundararajan et al. |
| 2006/0202885 A1* | 9/2006 | Chen ................... G01S 13/003 342/126 |
| 2012/0065858 A1* | 3/2012 | Nickolaou ............ B60Q 9/008 701/70 |
| 2013/0093615 A1* | 4/2013 | Jeon ................ G08B 13/19695 342/118 |
| 2019/0263358 A1* | 8/2019 | Kusumoto ............ H04W 4/021 |

* cited by examiner

*Primary Examiner* — Timothy X Pham
(74) *Attorney, Agent, or Firm* — Gunther J. Evanina; Butzel Long

(57) ABSTRACT

An improved bistatic radar detection system useful for detecting an imminent collision between a vehicle and a tracked object includes at least one radar module having both receiver circuitry and transmitter circuitry to allow a processor to dynamically select operations of the module as either a transmitter or a receiver of a bistatic radar set.

7 Claims, 10 Drawing Sheets

BISTATIC RADAR SYSTEM FOR MOTOR VEHICLE APPLICATIONS

FIELD OF THE DISCLOSURE

This disclosure pertains to bistatic radar systems used in motor vehicle applications, such as to deploy a passive restraint device upon detection of an imminent collision with another object or to warn a driver of a possible collision in an advanced driver assistance system.

BACKGROUND OF THE DISCLOSURE

Passive restraint systems have been used for many decades to reduce injuries and fatalities to occupants of a vehicle when a collision occurs. Commonly used passive restraint systems include airbags that are deployed upon detection of a collision. Such systems have generally relied upon collision sensors such as accelerometers. Airbag deployment is typically initiated within about 15 to 30 milliseconds after the onset of the collision, and the airbag is generally fully inflated within about 60 to 80 milliseconds from the onset of the collision. While passive restraints unquestionably save lives and reduce injuries, the speed at which airbags deploy can cause severe injuries such as whiplash, traumatic brain injuries, and neck and spine injuries.

In order to reduce injuries induced by airbag deployment, recent efforts have focused on developing detection systems that can predict an imminent collision allowing airbag deployment to be initiated before onset of the collision (e.g., about 15 to 20 milliseconds before onset of collision). This allows slower airbag deployment with less force, and therefore provides safer deployment, reducing or eliminating injury caused by airbag deployment. Being able to accurately predict an imminent collision also allows other passive protective measures such as retightening of seat belts.

A previously proposed system for predicting an imminent collision employs a bistatic radar system. Such systems employ one or more bistatic radar sets, each set comprising a transmitter, an associated transmitter antenna, a receiver, and an associated receiver antenna, wherein the receiver antenna and transmitter antenna are spaced apart in a fixed relationship to one another and to a vehicle on which the bistatic radar system is disposed. Each bistatic radar set is controlled by a microprocessor, and each antenna is uniquely associated with a particular transmitter or receiver. These known bistatic radar systems for predicting an imminent collision are configured in a star-like pattern, in which high-speed cabling is provided for communications between a central processing module and each transmitter and each receiver. It would be desirable to provide an improved bistatic radar system for predicting an imminent collision with improved capabilities and reduced cabling to reduce the cost of the system.

In the known bistatic radar systems for predicting an imminent collision, a target radar cross-section was estimated by assessing the degree to which a threshold exceedance time was modulated by a direct path signal from a transmitter to a corresponding receiver of a radar set. This technique has undesirable accuracy limitations when the amplitude of the radar signal leaking straight from the transmit antenna to the receive antenna is not well characterized. The direct path leakage signal amplitude limits the sensitivity of the radar system, but this limitation can be mitigated with improved antenna design possessing stronger nulls parallel to the face of the antenna. However, with the direct path leakage minimized, an alternative or additional method for estimating target radar cross-section is desired.

BRIEF DESCRIPTION OF THE DISCLOSURE

An improved bistatic radar system for all-around pre-crash detection and short-range driver assistance (1) reduces cable/wiring costs, (2) improves target radar cross-section estimation, and (3) provides rapid reconfiguration to adapt to the driving scenario.

Each radar module can be configured as either transmitter or receiver dynamically. Each radar module contains a timing reference crystal from which the radio frequency (RF) signal is derived using a phase-locked loop (PLL). When configured as a transmitter, the RF signal is amplified and pulsed out to the radar antenna at the commanded time. When the module is configured as a receiver, the module uses a reference time to begin the time measurement between the radar pulse leaving the transmitter and its arrival at the receiver and subsequent leading-edge detection. An embedded micro-controller in the radar module processes the radar range estimate information to perform target tracking, operating point adjustment, and threat warning message generation.

Because each radar module contains all of the hardware to operate as receiver or transmitter, the computing power to perform either the receive function or the transmit function, and the target tracking algorithm processing, the module may be dynamically configured to switch between these roles. This allows the module to dynamically change the transmitter-receiver pairing for improved coverage around the vehicle.

Within the receiver circuitry, the detector circuit output amplitude can be fed to two parallel comparator circuits, each with its own, software-adjustable, threshold level. The output of each comparator is a control input to an independent timer circuit. By setting the trigger threshold of each comparator to a different level, another estimate of target radar cross-section may be calculated. As the receiver circuitry will possess an inherent rise-time limitation, the threshold-crossing-time difference between the two comparators is inversely proportional to the radar cross-section of the target. This adds another method for target size estimation, in addition to those disclosed in the open literature.

The timer circuits previously disclosed were comprised of an integrator circuit. Another envisioned embodiment uses the PLL divider based counter as a substitute for the analog, integrator-based range estimation circuit of prior art. This PLL divider based counter would provide resolution on the order of 100 pico-seconds, which is roughly equivalent to a bi-static range resolution of an inch or two.

The cabling requirement for the disclosed radar systems can provide an improvement over known bistatic radar systems. The star-like twisted-pair configuration can be replaced with a more ring-like configuration because each module contains the distributed processing capability to run the target range estimation and target tracking algorithm within the radar module when it is configured as the receiver. The cabling requirement is reduced by approximately half compared to known bistatic radar systems. In another embodiment of the invention, the twisted-pair synchronization ring is replaced by an inductively switched single-wire current loop for timing synchronization. A small current is pulled from a voltage source and drawn around the current loop through an inductor and resistor to a sink. Quickly disabling the source and sink creates a fast voltage swing which is sensed at each module to create a timing synchronization signal.

In other embodiments, the high-speed differential pair wiring around the ring is also eliminated to further reduce the cabling costs by accomplishing timing synchronization through alternative means. When using these alternative means, each module need only connect to the low-latency bus ringed around to each module and to a central coordinating processor which interfaces to the rest of the automobile's safety system. The alternative synchronization methods are possible by taking advantage of the divider circuits within the PLL of each module. The PLL divider becomes part of a counter circuit that is used for timing synchronization, providing timing resolution under 200 pico-seconds. The reference signal for synchronization may be provided periodically over the low-speed bus by one of the modules tasked to provide the synchronization signal or from the centralized safety system processor of the vehicle. The actual counter value reached between successive synchronization signals is compared to the expected counter value, assuming the targeted VCO frequency, and used to adjust the expected counter value used to schedule future transmit pulse events or to begin integration in the bi-static range time-of-flight measurements in the receiver.

In still another embodiment, a pair of modules may synchronize directly from the transmitter radar pulse. In this implementation, the transmitter schedules pulses at a specified repetition rate. Forewarned of the approximate transmit timing, the receiver module configures gain and threshold settings to detect the direct path radar signal between transmitter and receiver. The counter from the PLL divider is then triggered by successive receiver comparator threshold exceedances to compare the actual counter value to the expected counter value. The error value is then used to adjust the scheduled counter value that begins integration in the bi-static range time-of-flight measurements for the reception of the next scheduled transmit pulse signal. This implementation improves upon previous art by using the methodology previously used for bi-static range zeroing and using it for timing synchronization as well, thereby eliminating the need for the high-speed synchronization bus.

The bistatic radar systems disclosed herein provide all-around imminent impact detection and driver assistance functions of blind-spot detection, parking assistance, pedestrian detection, and conceivably roll-over impact timing prediction.

BRIEF DESCRIPTION OF THE DRAWINGS

In FIGS. 1A-1B, the shielded twisted-pair ring configuration is used for timing synchronization.

In FIGS. 3A and 3B, timing synchronization is accomplished using an inductively switched current loop.

FIG. 7 is a schematic illustration of a radar system in accordance with this disclosure which synchronization using either signals over the system safety bus for synchronization or radar pulses from a transmitter module to paired receiver modules for synchronization.

DETAILED DESCRIPTION OF THE EMBODIMENTS

Figure 1A:
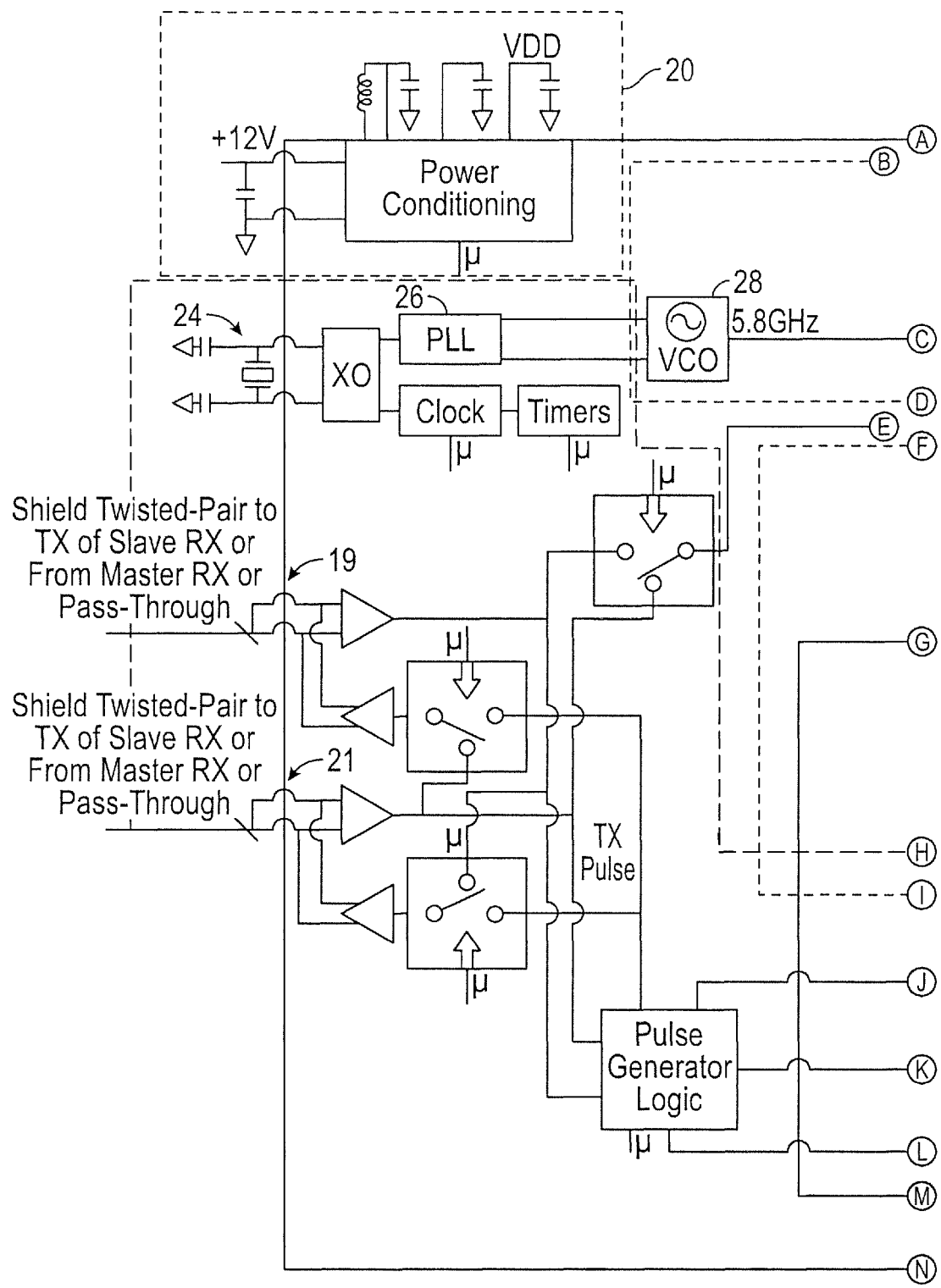
FIGS. 1A and 1B are a schematic illustration of a transmitter/receiver module having both receiver circuitry and transmitter circuitry associated with a single antenna used for transmitting or receiving a radar signal depending on how the module is configured.
Figure 1B:
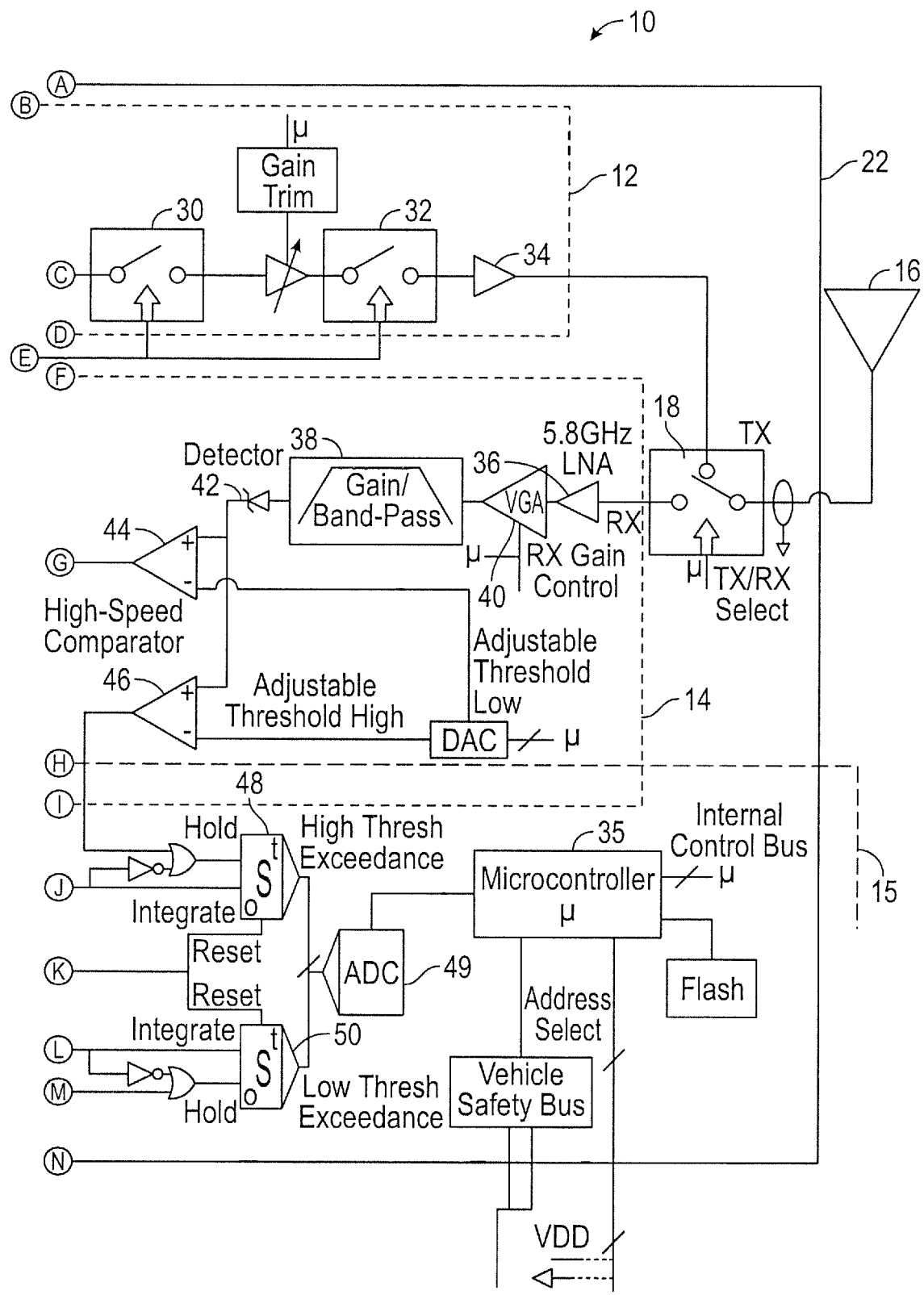

Shown in FIGS. 1A and 1B are a schematic illustration of a radar module 10 having transmitter circuitry 12, receiver circuitry 14, and a timing and control section 15. Module 10 has an associated antenna 16 that acts as a transmitter antenna for circuitry 12 and as a receiver antenna for circuitry 14, depending on the state of switch 18. Module 10 may include a power conditioning section 20, such as to regulate voltage and improve power quality to enable load equipment to function properly. The term "module" as used herein refers to the combination of a timing and control section 15, transmitter circuitry 12, and receiver circuitry 14 sharing a single antenna 16, and/or to a combination in which the timing and control section 15, transmitter circuitry 12, and receiver circuitry 14 are on the same printed circuit board 22.

Transmitter circuitry 12 includes a voltage-controlled oscillator (VCO) 28. The VCO is tuned using the timing reference crystal 24 and a phase locked loop (PLL) 26 in the timing and control section. The VCO generates the radio frequency (RF) signal for the transmitter (e.g., from about 2 GHz to about 24 GHz). With module 10 configured as a transmitter, high-speed switches 30 and 32 are closed for a short time, tens of nanoseconds, and the RF signal is amplified by amplifier 34 and pulsed out to antenna 16.

Receiver circuitry 14 is managed by an embedded microcontroller 35 in the timing and control section that facilitates target tracking and generation of a threat warning message on module 10. A received signal is amplified by amplifier 36 and variable gain amplifier 40 and conditioned in the bandpass filter 38. The implementation of variable gain and pass-band filtering may be distributed in any order or in multiple stages as an aid in mitigating out-of-band signals without desensitizing the receiver. A rectifier detector circuit 42 is used to detect the arrival of the received radar. The detector circuit is designed with bandpass characteristics to suppress unwanted noise signals and enhance leading edge detection of the received radar signal. The high-pass cut-off frequency is in the tens of megahertz to filter out most normal communications signals, and the low-pass cut-off frequency is in the hundreds of megahertz to facilitate a fast leading edge rise time. The output from detector 42 is fed to parallel comparators 44 and 46, each having a software adjustable threshold level. The output of each comparator is a control input to independent timers 48 and 50 in the timing and control section. By setting the trigger threshold of each comparator to a different level, an estimate of target radar cross-section can be calculated. Specifically, the threshold-crossing-time difference between the two comparators is inversely proportional to the radar cross-section of the target.

The control and timing section performs the functions of scheduling and synchronizing the transmission of the radar pulse and measurement of the time-of-flight until the leading edge of the radar pulse is detected by the receiver. In this embodiment of the invention, synchronization of the pulses is executed around the ring over twisted-pair or coaxial cables using the high-speed ports 19 and 21. Measurement of the time-of-flight of the bi-static radar pulse is accomplished by reading the voltage outputs of integrators 48 and 50 via the analog-to-digital converter (ADC) 49 in this embodiment of the invention. As integrated circuit switching speeds increase toward the ten gigahertz range in common commercial foundry processes, these integrators could be replaced with digital timers.

Figure 2:
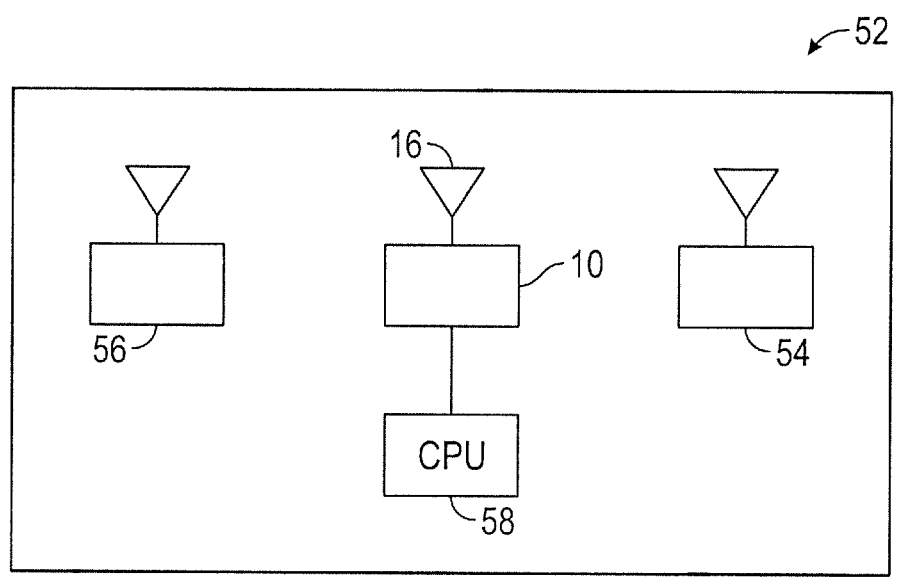
FIG. 2 is a schematic illustration of a radar system in accordance with this disclosure which uses shielded twisted-pair wiring for timing synchronization.

FIG. 2 depicts a radar detection system 52 in accordance with this disclosure comprises at least one radar module 10, as previously described, which includes both transmitter and receiver circuitry and an antenna 16, and which can be selectively operated as a receiver or transmitter. System 52 also includes at least one other radar module 54 and/or 56 which can pair with radar module 10 to form a transmitter to receiver pairing for bi-static range measurements. In this illustrated arrangement, transmitter 54 and module 10 can constitute a bistatic radar pair when module 10 is operated as a receiver, and receiver 56 and module 10 can constitute a different bistatic radar pair when module 10 is operated as a transmitter. Multiple receiver-configured modules may pair with a transmitter-configured module at one time. The radar modules communicate with each other and with the vehicle central processor for safety systems 58 over the vehicle safety bus 59, normally a CAN bus or automotive Ethernet in most embodiments. Timing synchronization is executed via a differential signal over the high-speed twisted-pair or coaxial cable bus 57 in this embodiment of the invention. One of the modules generates a synchronization signal, and the other modules receive and/or pass the signal around the ring to other modules.

While any number of modules may be employed in combination with dedicated radar receivers and transmitters, preferred radar detection systems employ a plurality of modules having both receiver and transmitter circuitry which are arranged to circumscribe a vehicle, such that any two modules with overlapping antenna beam patterns can be used in a bistatic radar detector pair.

Figure 3A:
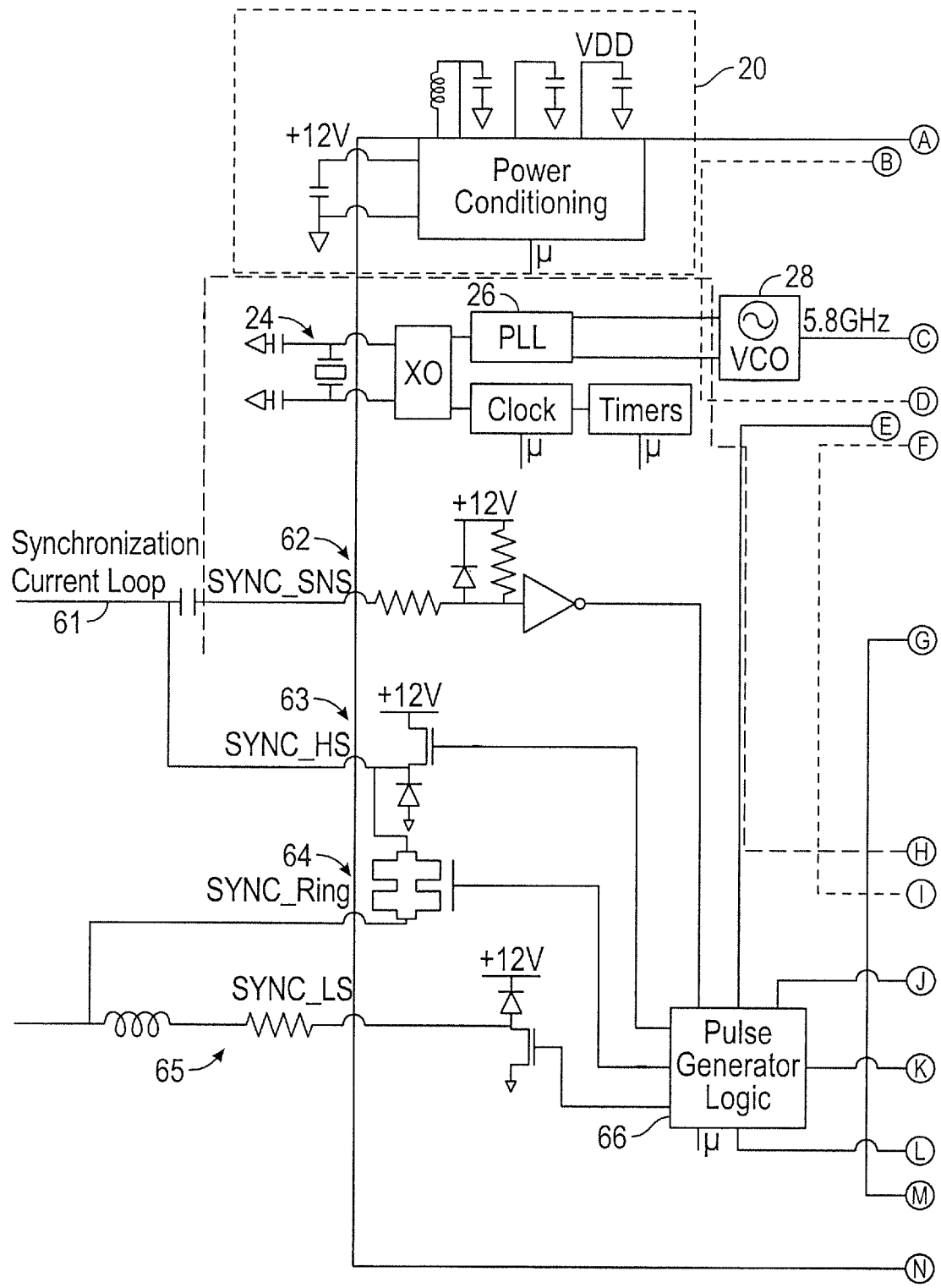
FIGS. 3A and 3B are a schematic illustration of a transmitter/receiver module having both receiver circuitry and transmitter circuitry associated with a single antenna used for transmitting or receiving a radar signal depending on how the module is configured.
Figure 3B:
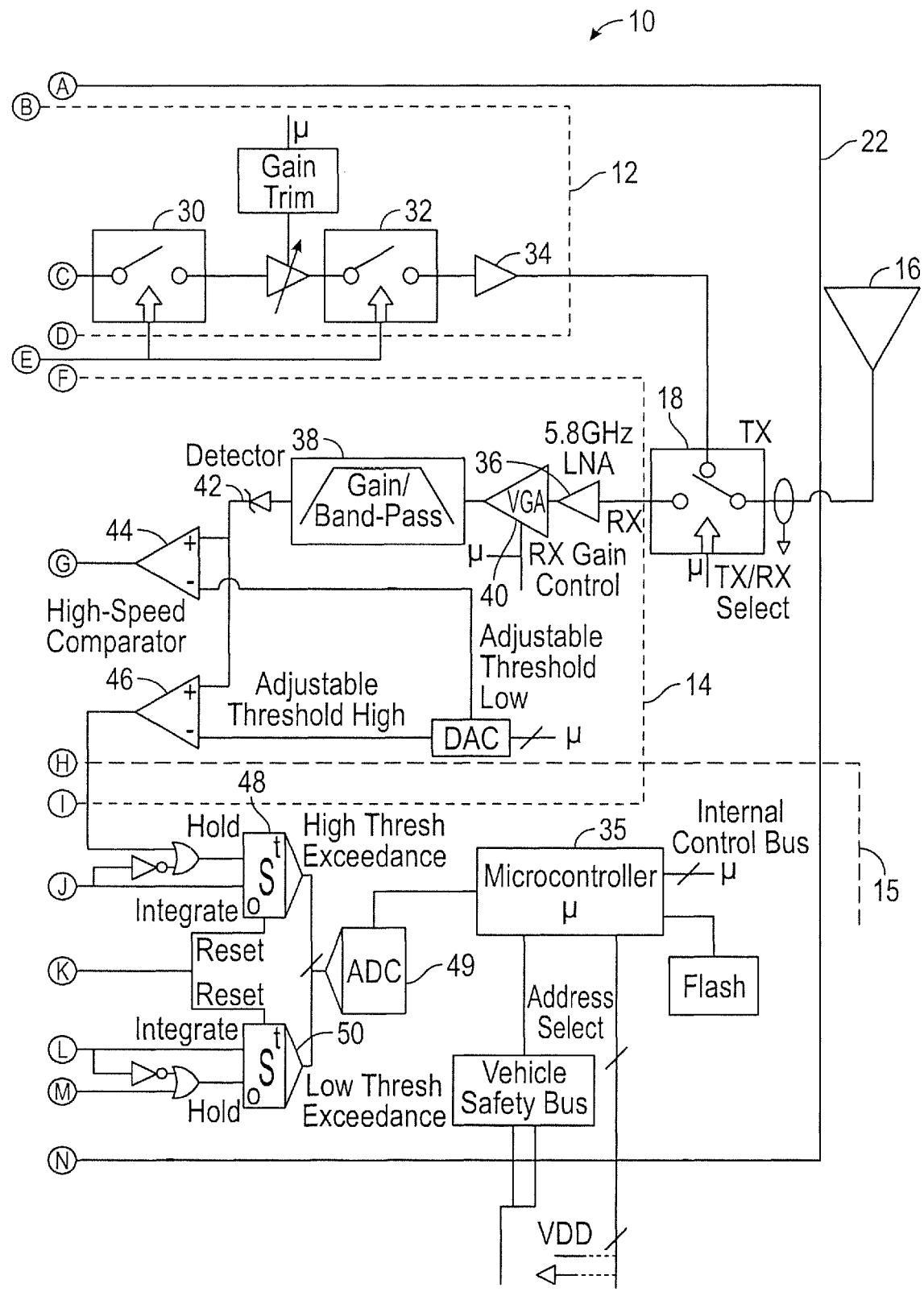
Figure 4:
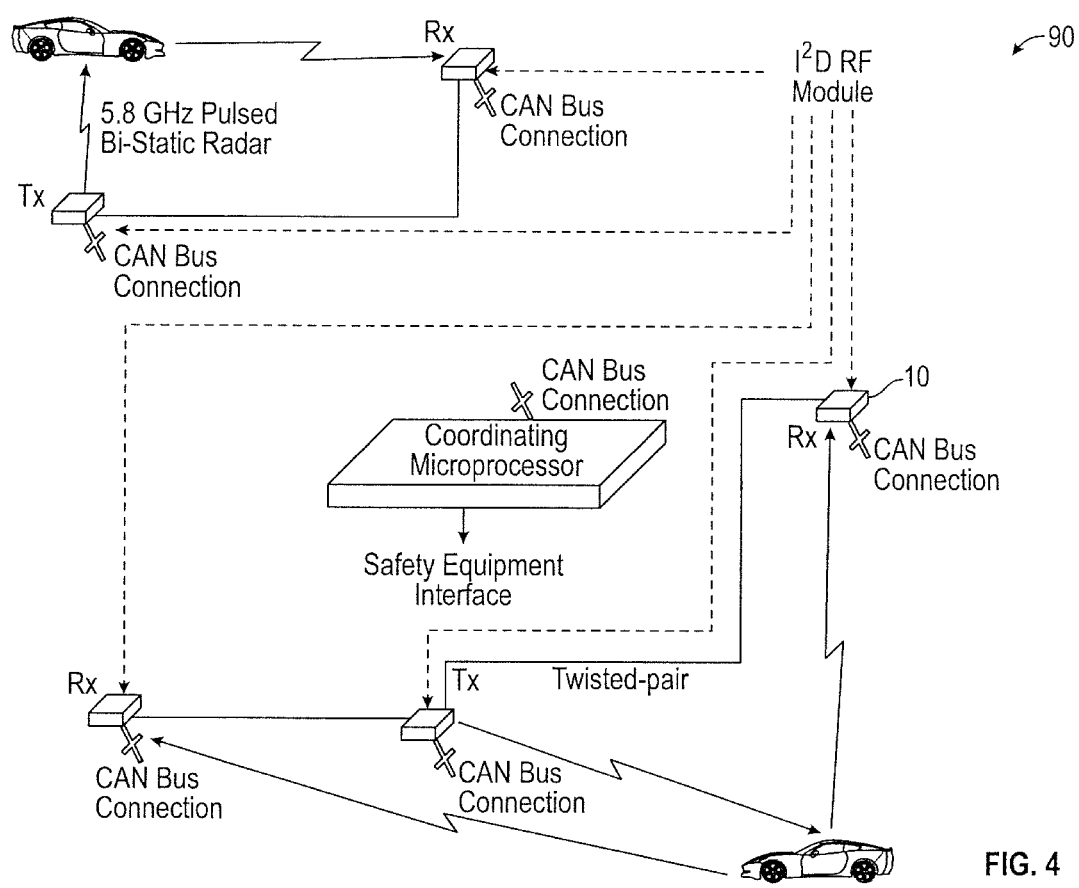
FIG. 4 is a schematic illustration of a radar system in accordance with this disclosure which uses a switched current loop for timing synchronization.

Shown in FIGS. 3A and 3B are a schematic illustration of a radar module implementation in accordance with this disclosure in which the wiring is further reduced by conducting timing synchronization over a single-wire current loop 61 instead of the high-speed differential pair connections disclosed in FIGS. 1A and 1B. For the module acting as the master to generate the timing synchronization pulse, the high-side of the current loop is connected to the high-side of the power rail at pin SYNC_HS 63. The low-side of the current loop is connected to SYNC_LS 65 through an inductor and current limiting resistor and switched to the ground side of the power rail. The value of the current limiting resistor is selected to be much larger than the wiring and transistor resistances. When SYNC_HS and SYNC_LS are switched on, the voltage on the current loop 61 will be close to the high-side power rail. Current is limited to milliamps so that power is not wasted, and electromagnetic interference is minimized when the current flow is switched off. The value of the inductor in the connection to SYNC_LS 65 is selected to be much larger than the wiring inductance in the cabling around the current loop. The cabling inductance is feasibly in the tens of micro-Henries, so a nominal value for the inductor in the connection to SYNC_LS might be around 100 micro-Henries. A synchronization pulse is transmitted around the current loop when the power connections at SYNC_HS 63 and SYNC_LS 65 are switched off rapidly with a fall time in the nanosecond range. The inductor connected to SYNC_LS 65 forces a rapid downward swing in the voltage on the current loop 61. This falling edge is sensed through the capacitively coupled connection to SYNC_SNS 62 in each of the modules receiving the synchronization pulse. A blanking circuit or one-shot in the Pulse Generator Logic 66 circuit prevents corruption of the signal by voltage ringing on the current loop 61. With regard to synchronization pulses, the connections for modules intended as slaves only can be simplified. The only connection to the current loop that is required is the capacitive coupling connection to SYNC_SNS 62. The connection between SYNC_HS 63 and SYNCH_RING 64 is shorted electrically, and the connection to SYNC_LS 65 is left disconnected and the associated resistor and inductor do not need to be populated. If a module is to be configured as a master only, then the connection to SYNCH_RING 64 may be left disconnected. The module may need to be configured as both master and slave with regard to synchronization. When configured as master, the analog switch between SYNC_HS 63 and SYNCH_RING 64 is turned off and left in a high impedance state. This leaves the power rail connection switches at SYNC_HS 63 and SYNC_LS 65 free to operate as described. When configured as a slave, the power rail connection switches at SYNC_HS 63 and SYNC_LS 65 are turned off to a high impedance state, and the analog switch between SYNCH_HS 63 and SYNCH_RING 64 is turned on to a low impedance state, completing the current loop ring. The synchronization signal is sensed on the falling edge of the synchronization pulse through the capacitively coupled connection to SYNC_SNS 62. FIG. 4 illustrates a preferred cabling arrangement for a radar system 52 in accordance with this disclosure in which cabling is further reduced by using the single wire current loop for timing synchronization. Module 10 is shown configured as the master for synchronization pulse generation. Modules 54 and 56 are configured as slaves with regard to timing synchronization.

Figure 5A:
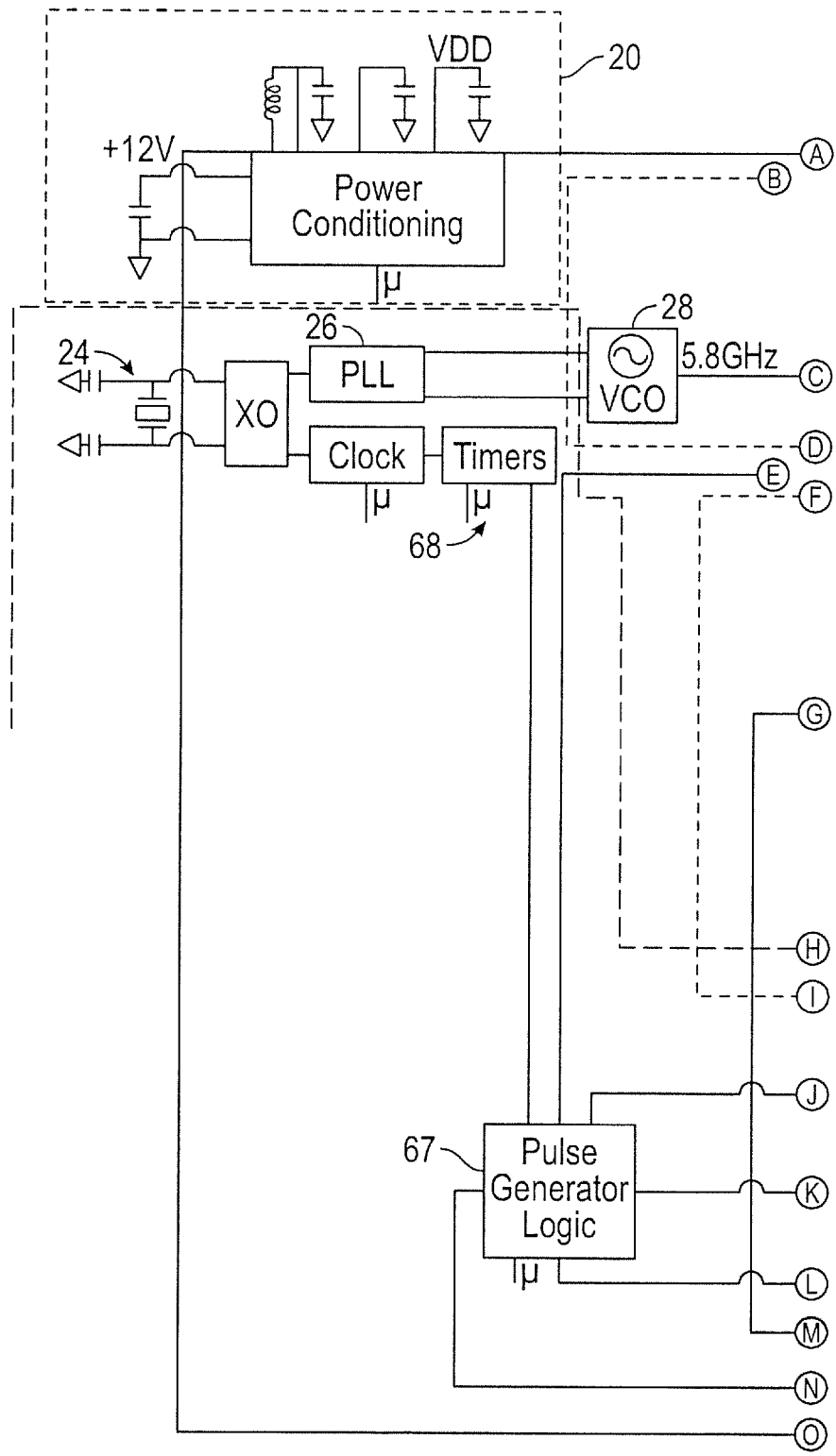
FIGS. 5A and 5B are a schematic illustration of a transmitter/receiver module configured to conduct synchronization over the vehicle safety bus in accordance with one embodiment of this disclosure.
Figure 5B:
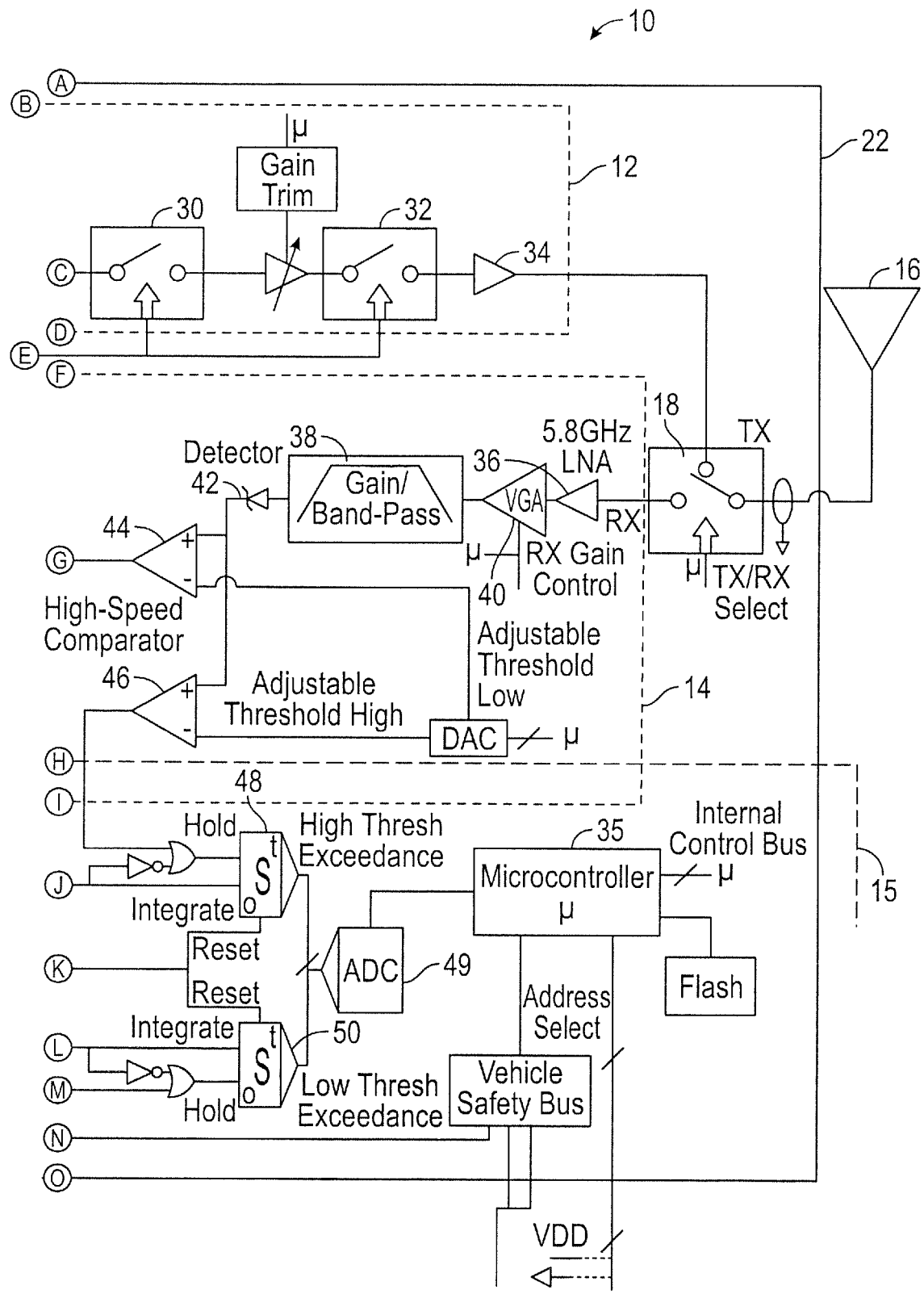

Shown in FIGS. 5A and 5B are a schematic illustration of a radar module 10 configured for timing synchronization over the vehicle safety bus, further reducing the cabling requirements for this radar system. As faster vehicle communications buses, such as automotive Ethernet, become prevalent in automobiles, and digital switching speeds in commercially viable integrated circuits become faster, the opportunity to further reduce the cabling required for timing synchronization becomes feasible as portrayed in FIGS. 5A and 5B. For synchronization, an additional address decoder in the Vehicle Safety Bus interface 66 is added. A synchronization master generates periodic writes over the Vehicle Safety Bus to a universal synchronization timing address. The address is recognized by the Vehicle Safety Bus interface 66 and a signal is transmitted to the Pulse Generator Logic 67. The Pulse Generator Logic signals the TIMERS block 68 to latch the value of a deep timer, perhaps 32-bits, which is counting the input signals to the PLL 26 derived from the VCO 28 frequency. The timer values for successive synchronization signals are read by the embedded microcontroller 35 and processed to calibrate the module timing against the master signal. The microcontroller 35 then writes the timer value to a digital comparator within the TIMERS 68 block to correspond to the next scheduled radar pulse. As the timer reaches the value programmed in the digital comparator, the TIMERS block 68 generates a signal to the Pulse Generator Logic 67 block, which initiates a transmitter pulse to switches 30 and 32 when the module is configured as a transmitter, or initiates the integrators 48 and 50 when configured as a receiver.

Figure 6A:
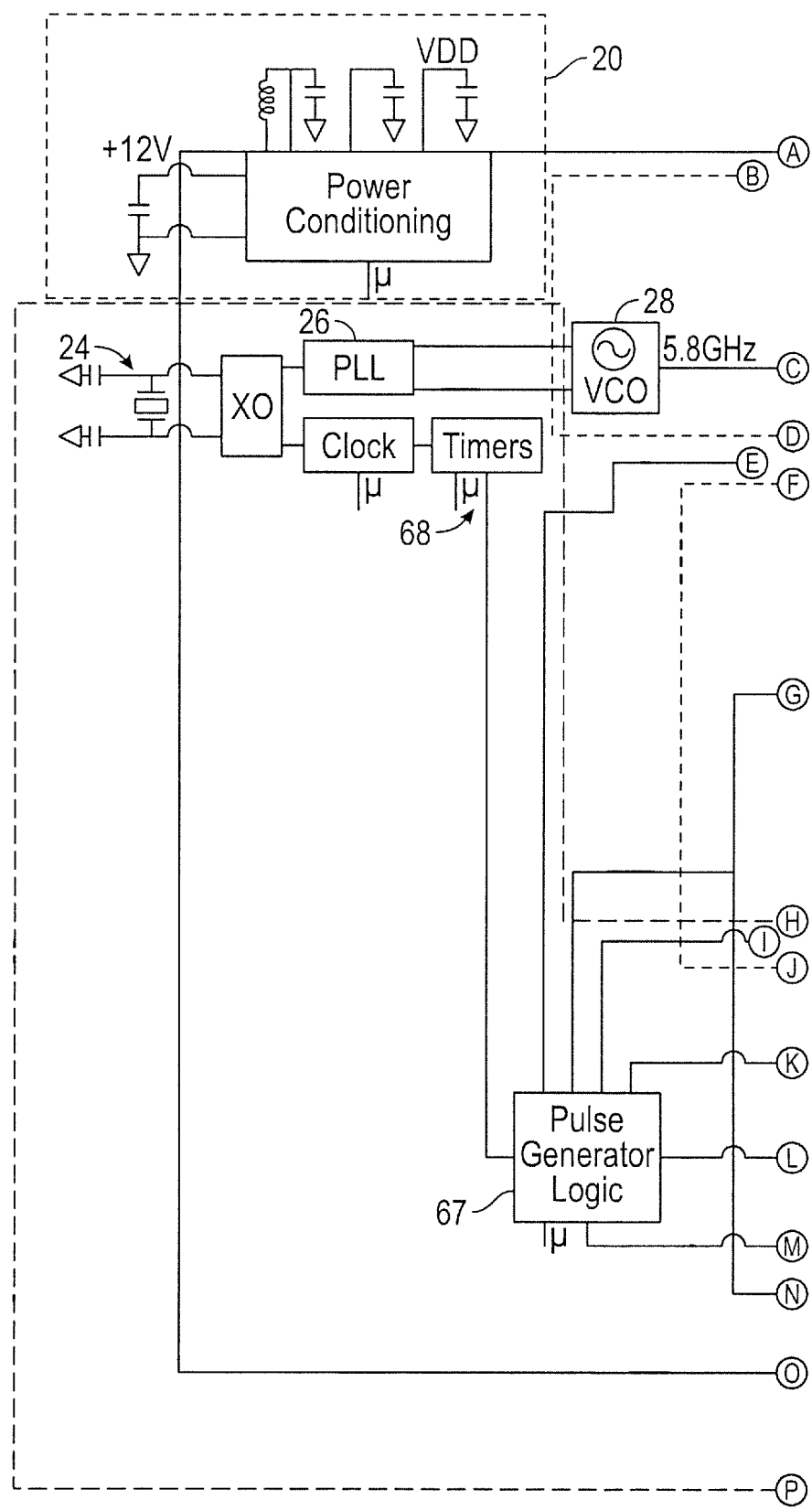
FIGS. 6A and 6B are a schematic illustration of a transmitter/receiver module configured to conduct synchronization between transmitter and receiver pairs using the transmitter radar pulse in accordance with one embodiment of this disclosure.
Figure 6B:
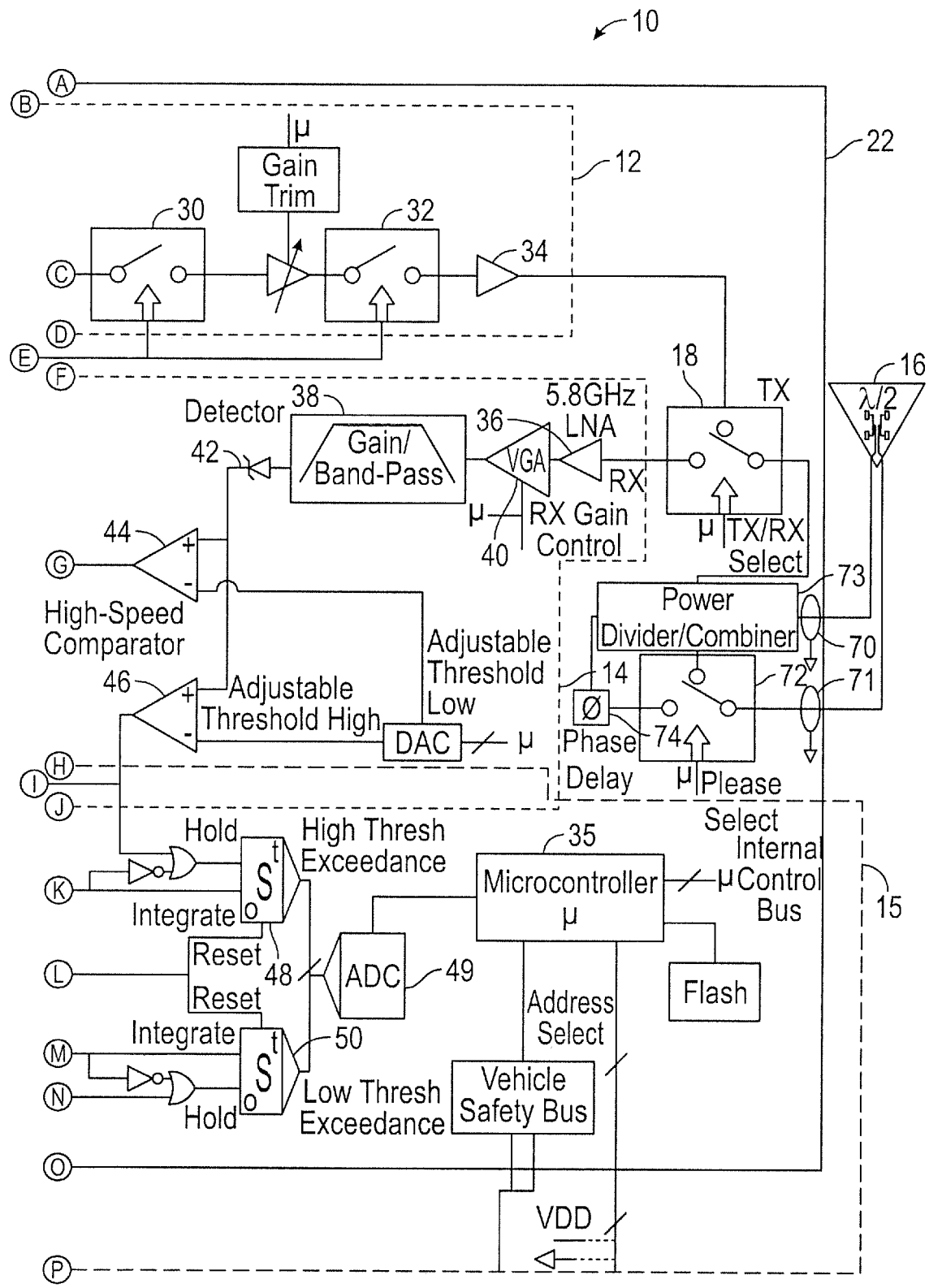

FIGS. 6A and 6B are a schematic portrayal of a radar module 10 in accordance with this disclosure which is configured for reduced cabling requirements by using scheduled radar pulses from a module configured as a transmitter to synchronize timing with the receiver-configured modules paired with this transmitter module. In this implementation, the transmitter-configured module lets the paired receiver-configured modules know when to expect radar pulses by communicating a message to them over the vehicle safety bus. The paired receiver configured module or modules configure the receiver gain in VGA 40 and thresholds in high speed comparator 44 and/or 46 such that the direct path signal between the transmitter antenna and the receiver antenna(s) is readily detectable. This is similar to the technique used in previous implementations for range zeroing the integrator values. However, in this implementation, the comparator outputs 44 and 46 also connect to the Pulse Generator Logic 67, which then signals the TIMERS block 68 to latch the value of a deep timer as described in the description for FIG. 5. Similarly, the embedded microcontroller 35 reads the latched value of the deep timer in the TIMERS 68 block and processes the values from successive pulses to calibrate the receiver module timer against the transmitter module timer. The timing of the next expected radar pulse event may then be loaded into the digital comparator of the TIMERS 68 block. Arrival of the expected pulse initiation time then causes the digital comparator within the TIMERS 68 block to signal the Pulse Generator Logic 67 block to initiate the integrators 48 and 50 in anticipation of measuring the bistatic range of the next radar target return to the receiver. It is foreseen that as digital switching speeds in commercially viable integrated circuits continue to increase, it will be feasible to eliminate the integrators 48 and 50 and replace them with two deep counters in the TIMERS 68 block. Threshold crossings from comparators 44 and 46 will signal the Pulse Generator Logic 67 to latch the values of the two deep counters in the TIMERS 68 block. The embedded microcontroller 35 then subtracts the expected transmitter pulse time from the latched deep counter values to estimate the bistatic range, with the difference between the two latched times used to estimate the radar cross-section of the detected target.

An improvement to the antenna system which can improve the synchronization timing described here is also portrayed in FIGS. 6A and 6B. The antenna 16 network has been fed from a single RF coax or transmission line in previous implementations. One normal implementation of antenna 16 uses a planar array with radiators separated horizontally by one-half wavelength so as to minimize the strength of the direct path radar signal between transmitter and receiver. In this improvement, the antenna 16 is fed from two RF signal connections 70 and 71 related to each other by phase delay. One signal comes directly from Power Divider/Combiner 73. The other RF signal connection 71 is connected to an RF switch 72. This switch 72 connects the RF path back to the power divider/combiner 73 through one of two selectable paths. One path is designed to provide the same phase as the connection to RF port 70. This path is used during normal operation, allowing the minimization of the direct path radar signal between transmitter and receiver to facilitate maximum sensitivity of the system. The other path goes through a phase delay 74 designed so as to provide a 180 degree phase shift between the signals at RF ports 70 and 71. This causes the antenna 16 pattern to be maximally sensitive to the direct path radar signal between transmitter and receiver, thereby making timing synchronization and range zeroing more easily executed. The embedded microcontroller 35 selects one of the two inputs to switch 72 as appropriate, directly from power divider/combiner 73 for normal target tracking, or through phase delay 74 for timing synchronization or range zeroing.

FIG. 7 illustrates a preferred cabling arrangement for a radar system 52 in accordance with this disclosure in which cabling is further reduced by using either the synchronization technique portrayed in FIGS. 5A and 5B or 6A and 6B. All radar modules 10, 54, and 56 are connected together and to the centralized safety system controller 58 over the Vehicle Safety Bus 59.

The foregoing description and accompanying drawings are for purposes of illustrating the claimed subject matter, and are not to be interpreted as limiting the scope of claims.

What is claimed is:

1. A bistatic radar detection system for detecting nearby objects or predicting a vehicle collision with an object, comprising:
   two or more radar modules positioned spacially around the vehicle each having transmitter circuitry, receiver circuitry, timing and control circuitry, and an associated antenna; and
   wherein a processor in the timing and control circuitry can dynamically configure the individual modules as either a transmitter or receiver and contains a capability to track targets in overlapping antenna patterns of paired transmitters and receivers;
   wherein each module is connected to a vehicle safety bus for digital communications between modules and a host processor interfacing with vehicle driver assist and safety measure function;
   wherein each radar module is connected to the others via a high-speed bus for timing synchronization; and
   wherein the timing synchronization bus is comprised of a current loop switched by a timing master module through a current limited inductor so as to create a timing synchronization voltage swing detectable by the other radar modules when a current flow is interrupted quickly.

2. The radar detection system of claim 1 wherein the timing synchronization bus is comprised of a high-speed differential bus connection from the one module to each of its closest neighbors either directly or via pass-through of a neighboring module.

3. The radar detection system of claim 1 wherein the timing synchronization of the radar modules is executed via communications over the vehicle safety bus.

4. A bistatic radar detection system for detecting nearby objects or predicting a vehicle collision with an object, comprising:
   two or more radar modules positioned specially around the vehicle each having transmitter circuitry, receiver circuitry, timing and control circuitry, and an associated antenna; and
   wherein a processor in the timing and control circuitry can dynamically configure the individual modules as either a transmitter or receiver and contains a capability to track targets in overlapping antenna patterns of paired transmitters and receivers; and wherein scheduling of the radar pulse transmission or reception timing within each module is synchronized and calibrated against a timing master source using a high-speed counter to correct the module timer schedule to the master clock rate.

5. A bistatic radar detection system for detecting nearby objects or predicting a vehicle collision with an object, comprising:
  two or more radar modules positioned specially around the vehicle each having transmitter circuitry, receiver circuitry, timing and control circuitry, and an associated antenna; and
  wherein a processor in the timing and control circuitry can dynamically configure the individual modules as either a transmitter or receiver and contains a capability to track targets in overlapping antenna patterns of paired transmitters and receivers;
  wherein each module is connected to a vehicle safety bus for digital communications between modules and a host processor interfacing with vehicle driver assist and safety measure functions; and
  wherein timing synchronization between a radar module configured as a transmitter and the one or more radar modules configured as receivers and paired with the transmitter module is conducted using transmitter pulses at a pre-defined timing interval which are received by the paired receiver modules, whereby the timing of the received radar pulse from a direct path signal between transmitter and receiver is used to calibrate and synchronize the receiver scheduling of future radar pulse timing measurements to the transmitter clock rate using a high-speed counter.

6. The radar detection system of claim 5 wherein the phase delay of the antenna feed network is configurable to either minimize the amplitude of the direct path signal between transmit and receive antenna modules or to enhance the amplitude of the direct path signal so as to facilitate timing calibration and synchronization.

7. A bistatic radar detection system for detecting nearby objects or predicting a vehicle collision with an object, comprising:
  two or more radar modules positioned spacially around the vehicle each having transmitter circuitry, receiver circuitry, timing and control circuitry, and an associated antenna;
  wherein a processor in the timing and control circuitry can dynamically configure the individual modules as either a transmitter or receiver and contains a capability to track targets in overlapping antenna patterns of paired transmitters and receivers; and
  wherein the receiver circuit includes first and second parallel comparators, the first comparator configured for receiving the detected signal and a low threshold signal and outputting a first control signal, the second comparator configured for receiving the detected signal and a high threshold signal and outputting a second control signal; and wherein the receiver circuit further includes parallel timer means for determining threshold-crossing-time difference between the first and second control signals, and wherein the microcontroller is configured to correlate the threshold-crossing-time difference between the first and second control signals to a radar cross-section of a target.

* * * * *